Jan. 13, 1970 R. E. HIGGINS 3,489,219
METHOD OF LOCATING TOPS OF FLUIDS IN AN ANNULUS
Filed March 10, 1966
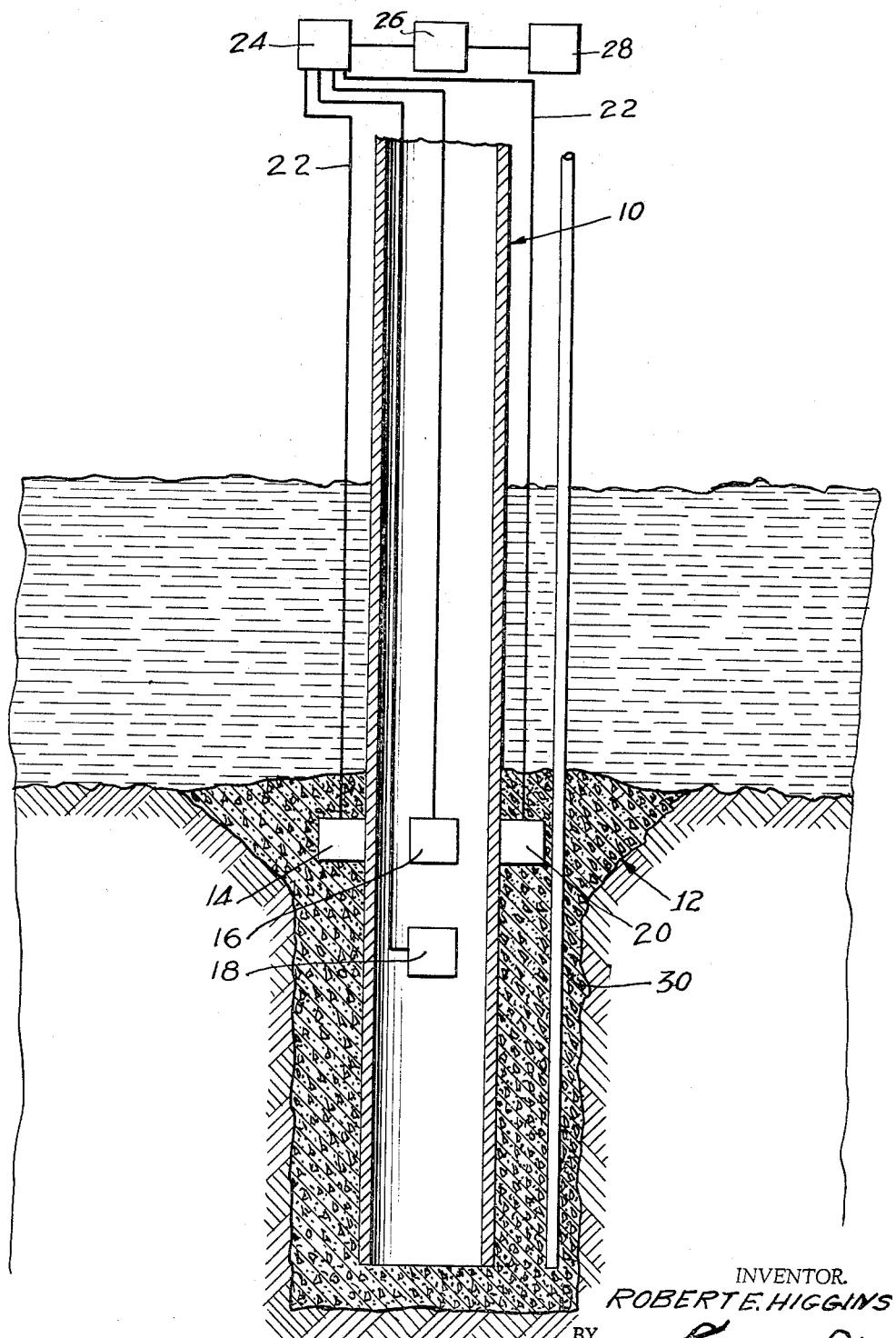
INVENTOR.
ROBERT E. HIGGINS
BY
*Lyon & Lyon*
ATTORNEYS

United States Patent Office 3,489,219
Patented Jan. 13, 1970

3,489,219
METHOD OF LOCATING TOPS OF FLUIDS IN AN ANNULUS
Robert E. Higgins, Los Angeles, Calif., assignor to Halliburton Company, Duncan, Okla., a corporation of Delaware
Continuation-in-part of application Ser. No. 434,482, Feb. 23, 1965. This application Mar. 10, 1966, Ser. No. 533,313
Int. Cl. E21b *33/13, 47/00*
U.S. Cl. 166—253                3 Claims

ABSTRACT OF THE DISCLOSURE

The level of a liquid hardenable material such as cement in an annular space between a borehole and well casing of a gas well, oil well or the like, is determined by the incorporation of a detectable material such as a radioactive material in the cement and placing detecting means in the borehole so that the detecting means will indicate when the level of the cement in the annulus is at the same level as the detecting means.

---

This application is a continuation-in-part of Ser. No. 434,482, filed Feb. 23, 1965, and now abandoned, the disclosure of which is expressly incorporated herein.

In oil well drilling operations, particularly off shore oil well drilling, it is essential that the cement or other liquid hardenable material in the annular space between the borehole and the casing, extend sufficiently far up from the bottom of the borehole to secure and hold the casing in place. More particularly in off shore drilling, it is essential that the liquid hardenable material around the casing reach from the bottom of the borehole to the sea bottom. In many instances it is difficult to establish when the liquid hardenable material has completely filled the annular space. This problem is especially acute in offshore drilling, since the softness of the sea bottom usually results in a crater being produced during drilling. For this reason, it is difficult to determine whether the liquid hardenable material being injected into the annular space has completely filled the annular space from the bottom of the well to the sea bottom.

Heretofore, various methods have been proposed for determining the level of a liquid hardenable material in the annular space around the casing. One method used in offshore operations is to send divers to the sea bottom to visually ascertain whether the cement slurry or other liquid hardenable material has reached the sea bottom. Similarly, television cameras are sometimes lowered to inspect the sea bottom in the vicinity of the casing. Various other methods for determining the level of the cement in the annular space have been proposed. However, none of these have been found to be completely satisfactory. The visual method employed in the case of offshore operations poses particular problems since there is little visual difference between the mud at the bottom of the sea and the cement slurry. Moreover, the churning of the mud caused by the injection of the cement slurry causes murkiness in the water, thus hindering visibility. According to the present invention, a method has been developed which is effective in eliminating the problems previously encountered in establishing the level of the cement in annular space surrounding a casing.

It is, therefore, an object of this invention to provide a novel method for determining the level of a liquid hardenable material in the annular space between the borehole and the casing in a well.

Another object of this invention is to permit the cement slurry level to be determined at a point remote from the well itself.

These and other objects of this invention will become apparent to those skilled in the art from the following description.

SUMMARY OF THE INVENTION

Briefly, the present invention provides a method for determining the level of a liquid hardenable material in the annular space between the borehole and casing in a well whereby a detector is placed in the borehole and the liquid hardenable material contains a material which is detected by the detecting device such as radioactive material. Then, when the liquid hardenable material in the annulus reaches the level of the detecting device, its presence will be detected.

By the present invention there is provided a means employing instruments which gives positive evidence when the liquid hardenable material being injected has reached any desired level within the annular space. According to the present invention, the level of the liquid hardenable material in the annular space is determined by the placing of at least one liquid hardenable material detecting means within the borehole before the introduction of a liquid hardenable material into the annular space is commenced. The liquid hardenable material-detecting means is connected, for example, by electrical leads to suitable switching, amplifying, and recording means. Thereafter, the liquid hardenable material is injected into the annular space. When the liquid hardenable material reaches the level of the liquid hardenable material-detecting means, a signal is transmitted to the surface or any accessible location, which indicates that the liquid hardenable material has reached the vicinity of the detectors.

A schematic drawing showing one application of the method of the present invention is shown in the figure. In the figure the casing 10 is first placed in the borehole 12. Affixed to the casing in this application are four liquid hardenable material-detecting means, in this case gamma detectors 14, 16, 18 and 20. As shown in the drawing, two of the detecting means, 14 and 20, are on the outside of the casing and two of the detecting means, 16 and 18, are on the inside of the casing. According to the present invention, the detecting means may be placed in either location and need not necessarily be attached directly to the casing. These gamma detectors are connected electrically by leads 22 to switching device 24, which in turn feeds amplifier 26. The output from amplifier 26 is utilized to operate indicator 28, which may provide audio or visual indication of the output from the gamma detectors. Into the annular space between the borehole and the casing is then pumped a wet cement slurry 30 or other liquid hardenable material containing a small effective amount of a gamma-ray emitting material. As the cement reaches the level of the four detectors, indicator 28 will register a sharp increase in the gamma emission, thus signifying that the cement has reached the level of the indicators.

It will be immediately apparent to those skilled in the art that many variations are possible within the scope of the method of the present invention. It will also be understood that the detectors may be positioned anywhere within the annular space, or on the exterior or interior wall of the casing. For example, by spacing the liquid hardenable material detecting means at different levels on the casing it is possible not only to locate the top of the cement, but also to follow the progress of the cement of the annular space as it is injected. Likewise while in the figure there are employed four detectors at a single level in order to ascertain when the cement completely surrounds the casing at that level, it is apparent that more or fewer detectors could be used depending upon the size of the casing, the size of the detectors, the degree of accuracy desired, and the like.

It is also to be understood that detecting devices 14, 16, 18 and 20 need not be gamma detectors. Many other liquid hardenable material sensing may be utilized. For example, when a gamma emitting material is added to the cement, an X-ray detector, G-M tube or ion chamber may be utilized as the detecting means. Likewise, a glass electrode or a hydrogen electrode may be used as the sensing means in the annular space with the pH of the cement itself serving as the activator.

In still other applications of the present invention, the cement-detecting means may be a temperature sensitive device, such as a thermometer, gas-filled bulb or thermocouple in the annular space. A thermistor or other temperature sensitive device could detect the temperature differential between the air, mud or water present in the annular space prior to the cement injection, and the temperature of the cement itself. If necessary, the temperature of the cement could be controlled by the use of hot water or ice water in mixing part or all of the cement.

The liquid hardenable material-detecting means may utilize practically any part of the electro-magnetic spectrum, including ultraviolet, visible infra-red, radio and micro-waves in the annular space. For example, a generator of electro-magnetic emissions of a desired spectrum might be affixed outside the casing in proximity to the detector. The liquid hardenable material would then be detected when it replaced the water, mud, air or other material present between the generator and the detector.

The liquid hardenable material-detecting means can also be a capacitor in the annular space, the capacitance of which is affected when cement replaces the water or mud or air between two charged plates. The detector can be an electrical resistance or conductance in the annular space, which could be used to indicate when the cement or other liquid hardenable material has replaced any other material between the plates. Likewise, in lieu of the incorporation of gamma emitting material in the cement slurry a magnetic susceptable material would be incorporated in the cement. In this way, a change in a magnetic movement could be detected when the cement slurry reaches an appropriate detector sensitive to changes in the magnetic field. Furthermore, electrodes could be used as detectors in the annular space, e.g., a silver-silver chloride; platinum couple could be used in conjunction with "salt cement" or other liquid hardenable material to detect the cement. Many other variations of the invention will be apparent to those skilled in the art.

The indicator 28 could be any type of device which would call attention to the fact that the liquid hardenable material has reached the level of the detector, such as an alarm bell, buzzer, meter, scale, recorder, light, etc. The switching device 24 and the amplifier 26, may be any apparatus capable of converting the output of any detector to a discernable output impulse. The selection of such apparatus is dependent upon the type of output impulse desired. However, apparatus suitable for accomplishing this purpose is commercially available, and its adaption to the present invention will immediately become apparent to those skilled in the art. Accordingly, the specific construction of the apparatus will not be further detailed herein.

The present invention is particularly adapted to the method of establishing the cement slurry level in the annular space between the casing and the outer surface and the borehole of a well. However, other liquid hardenable materials may be utilized and are within the scope of the present invention. For example, the partially saponified heat-treated rosin materials disclosed in U.S. Patent 2,754,265 may also be employed in the practice of the present invention. Many other similar liquid hardenable materials will be immediately apparent to those skilled in the art.

The following example is illustrative of the method of the present invention.

EXAMPLE 1

Radioactive iodine ($I_{131}$) was placed in a cement slurry, the slurry having the following composition:

Mixture of equal parts of Portland cement and
  pozzolanic material _____ sacks__ 1140
Water _____ gallons__ 4400
$I_{131}$ _____ millicuries__ 187

A well was drilled to a depth of 158.12 ft. below ground level. Into the well was placed a 48-inch casing, the bottom of which was set 158 ft. below ground level and having attached thereto four Geiger tubes connected to a Model 107C Geiger counter manufactured by Precision Radiation Instruments, Inc. The four Geiger tubes were positioned around the outside wall of the casing at the same level, and were located about 75 feet below the ground level. Thereafter, the addition of the cement slurry was begun. Initially, all four of the Geiger tubes read from about 0 to about 0.03 mr./hr. However, as the cement was added, the Geiger counter readings increased and eventually levelled off at about .2 to about .9 mr./hr., indicating that the cement had reached the level of the Geiger tubes.

When the well is underwater, and it is desired that a signal be given when the liquid hardenable material has reached the ocean floor, this may be accomplished by attaching one or more detectors (gamma detectors, thermocouples, pH detectors, etc.) to the casing at the level of the ocean bottom.

Having fully described the invention, it is intended that it be limited only by the lawful scope of the appended claims.

I claim:
1. The method of establishing the level of a liquid hardenable material in the annular space between the casing and the outer surface of the borehole of an oil well which comprises placing within the annular space at least one pH sensing means, said pH sensing means being in communication with an indicator means adapted to manifest the output of the pH sensing means in sensible form, said pH sensing means being positioned outside the casing at the level to be sensed so that said pH sensing means can detect the pH of the liquid hardenable material in proximity to it, and injecting liquid hardenable material into the annular space until the indicator means indicates that the liquid hardenable material has reached the level to be sensed.

2. The method of claim 1 wherein the liquid hardenable material is cement.

3. The method of claim 1 wherein the oil well is an offshore underwater well.

References Cited

UNITED STATES PATENTS

| | | | |
|---|---|---|---|
| 2,050,128 | 8/1936 | Schlumberger | 166—5 |
| 2,171,840 | 9/1939 | Armentrout et al. | 166—5 |
| 2,192,123 | 2/1940 | Bennett | 324—30 X |
| 2,220,205 | 11/1940 | Buckley | 166—5 |
| 2,239,531 | 4/1941 | Laurie | 166—.5 |
| 2,305,229 | 12/1942 | Alexander. | |
| 2,453,456 | 11/1948 | Piety. | |
| 2,524,933 | 10/1950 | Silverman | 324—30 X |
| 2,217,708 | 10/1940 | Scaramucci | 166—5 |

CHARLES E. O'CONNELL, Primary Examiner

IAN A. CALVERT, Assistant Examiner

U.S. Cl. X.R.

324—30